US010969035B2

(12) United States Patent
Williams et al.

(10) Patent No.: US 10,969,035 B2
(45) Date of Patent: Apr. 6, 2021

(54) REDUNDANT VEHICLE CONTROL SYSTEMS

(71) Applicant: Woodward, Inc., Fort Collins, CO (US)

(72) Inventors: Mark Williams, Thousand Oaks, CA (US); William Ernest Stone, Santa Clarita, CA (US); Oscar R. Arguelles, Palmdale, CA (US); Ori Dov Chen-Zion, West Hills, CA (US)

(73) Assignee: Woodward, Inc., Fort Collins, CO (US)

( * ) Notice: Subject to any disclaimer, the term of this patent is extended or adjusted under 35 U.S.C. 154(b) by 1244 days.

(21) Appl. No.: 15/059,494

(22) Filed: Mar. 3, 2016

(65) Prior Publication Data
US 2017/0253318 A1   Sep. 7, 2017

(51) Int. Cl.
*F16K 31/42* (2006.01)
*F15B 18/00* (2006.01)
(Continued)

(52) U.S. Cl.
CPC ............ *F16K 31/426* (2013.01); *B64C 13/42* (2013.01); *B64F 5/60* (2017.01); *F15B 18/00* (2013.01);
(Continued)

(58) Field of Classification Search
CPC ......... B64C 13/36; B64C 13/40; B64C 13/42; B60S 9/04; B60S 9/14; B60S 9/12; B60S 9/06; B60D 1/66; F16K 31/426; F15B 19/005; F15B 18/00; F15B 20/004; F15B 15/1409; F15B 2211/575; F15B 2211/5753; F15B 2211/5756
See application file for complete search history.

(56) References Cited

U.S. PATENT DOCUMENTS

| 3,338,139 A | * | 8/1967 | Wood | ...................... B64C 13/42 91/510 |
| 3,426,792 A | * | 2/1969 | Wood | .................... F15B 20/008 137/596.12 |

(Continued)

FOREIGN PATENT DOCUMENTS

| EP | 2505496 A2 | 10/2012 |
| EP | 2527248 A2 | 11/2012 |
| GB | 2057718 A * | 4/1981 ............. B64C 13/36 |

OTHER PUBLICATIONS

International Preliminary Report on Patentability in International Application No. PCT/US2017/019664 dated Sep. 13, 2018, 8 pages.
(Continued)

*Primary Examiner* — Timothy D Collins
*Assistant Examiner* — Terri L Filosi
(74) *Attorney, Agent, or Firm* — Fish & Richardson P.C.

(57) ABSTRACT

Embodiments of the disclosure include a redundant control system for a vehicle. The redundant control system includes first and second actuator pistons mechanically coupled to one another and disposed in respective first and second fluid chambers. The first and second actuator pistons are movable by first and second primary stages. One of the primary stages includes a bypass valve with a pilot valve actuatable in response to movement of the first actuator piston.

20 Claims, 5 Drawing Sheets

(51) Int. Cl.
*F15B 19/00* (2006.01)
*B64F 5/60* (2017.01)
*F16K 11/07* (2006.01)
*B64C 13/42* (2006.01)
*F15B 13/04* (2006.01)

(52) U.S. Cl.
CPC .......... *F15B 19/005* (2013.01); *F16K 11/07* (2013.01); *F15B 2013/0409* (2013.01); *F15B 2211/6336* (2013.01); *F15B 2211/8757* (2013.01)

(56) References Cited

U.S. PATENT DOCUMENTS

| | | | | |
|---|---|---|---|---|
| 3,580,139 A | | 5/1971 | Rasmussen | |
| 4,257,311 A | * | 3/1981 | Barnsley | G05D 1/0077 91/363 A |
| 4,313,468 A | * | 2/1982 | Patel | F15B 13/0438 137/625.61 |
| 4,449,446 A | * | 5/1984 | Degnan | B64C 13/36 92/146 |
| 4,533,097 A | | 8/1985 | Aldrich | |
| 4,805,515 A | * | 2/1989 | Kast | B64C 13/42 91/461 |
| 4,864,812 A | | 9/1989 | Rodgers et al. | |
| 4,967,124 A | * | 10/1990 | Hirai | B64C 13/42 318/564 |
| 5,074,495 A | * | 12/1991 | Raymond | B64C 13/40 244/78.1 |
| 5,100,082 A | * | 3/1992 | Archung | B64D 41/00 244/76 R |
| 5,117,868 A | * | 6/1992 | Wagner | B64C 13/40 137/625.64 |
| 5,385,011 A | | 1/1995 | Steward, Jr. | |
| 5,600,220 A | * | 2/1997 | Thoraval | B64C 13/42 318/562 |
| 5,768,973 A | * | 6/1998 | Cochran | E02F 9/2225 91/516 |
| 6,685,138 B1 | * | 2/2004 | Krantz | B64C 13/40 244/99.5 |
| 6,981,439 B2 | * | 1/2006 | Hart | B64C 13/42 91/509 |
| 8,109,464 B2 | | 2/2012 | Bhargava | |
| 2003/0221730 A1 | * | 12/2003 | Porter | F15B 11/042 137/625.64 |
| 2004/0237518 A1 | * | 12/2004 | Fenny | B64C 13/42 60/403 |
| 2009/0165457 A1 | * | 7/2009 | Kakino | F15B 18/00 60/547.1 |
| 2009/0320460 A1 | | 12/2009 | Peterson | |
| 2011/0303785 A1 | * | 12/2011 | Delloue | B64C 25/405 244/50 |
| 2014/0140871 A1 | | 5/2014 | Grieser | |
| 2015/0292527 A1 | * | 10/2015 | Marger | B64C 27/64 60/494 |
| 2016/0098045 A1 | * | 4/2016 | Ito | B64C 13/42 137/488 |
| 2017/0002937 A1 | * | 1/2017 | Yoshida | F16K 11/07 |

OTHER PUBLICATIONS

International Search Report and Written Opinion of the International Searching Authority issued in International Application No. PCT/US2017/019664 dated Jun. 8, 2017; 12 pages.

* cited by examiner

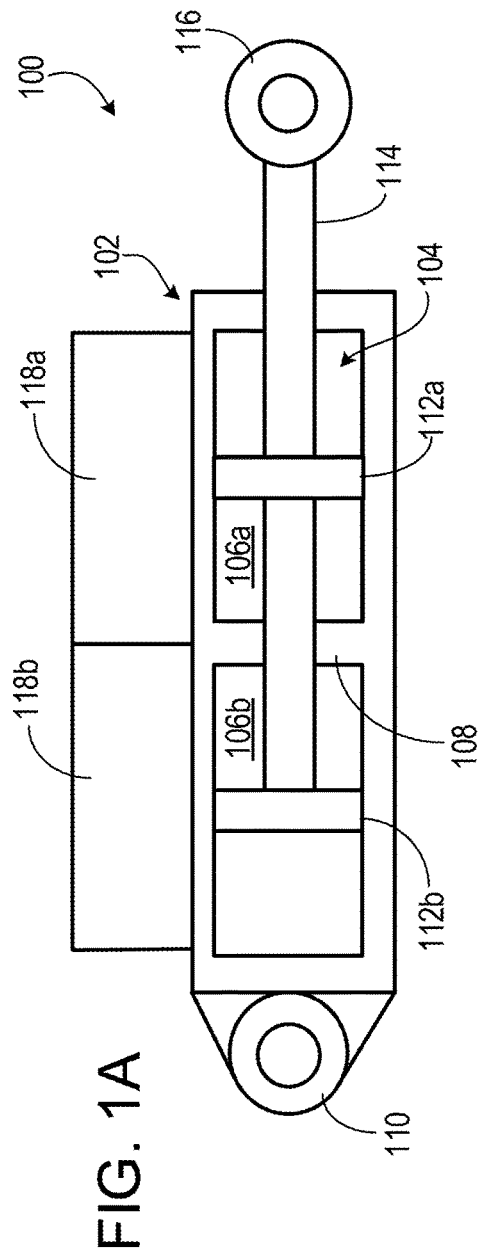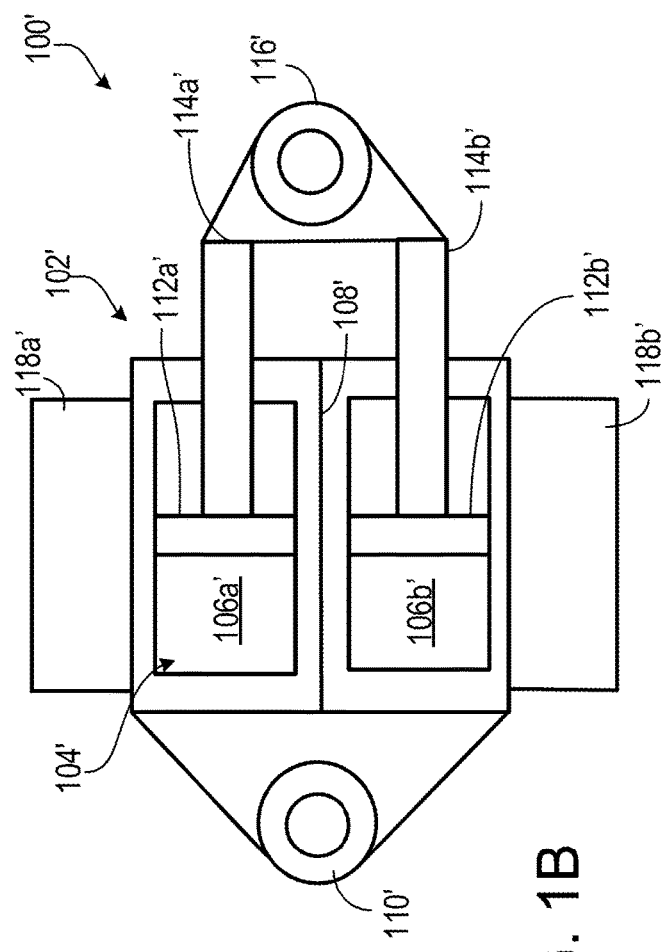
FIG. 1A
FIG. 1B

REDUNDANT VEHICLE CONTROL SYSTEMS

TECHNICAL FIELD

This specification generally relates to redundant vehicle control systems operable in one or more ground and flight operating modes.

BACKGROUND

Critical valve position sensors of a fly-by-wire main rotor actuator must be tested for proper functioning prior to each flight to confirm that a dormant failure has not occurred. The existence of a dormant failure would pose an unacceptable safety risk. In conventional control systems, this requires that two or more redundant hydraulic stages each have their own auxiliary pressure source (e.g., one or more pumps) to move the valves when commanded during pre-flight testing, and, in turn, change the output signal of the sensors. These hydraulic stages are typically powered by a main system pump, and are therefore not operable during pre-flight testing when the vehicle's primary hydraulic sources are dormant. Thus, the auxiliary pressure sources are added to the system solely to facilitate pre-flight testing, and are otherwise not used during flight.

SUMMARY

One aspect of the present disclosure provides a redundant control system for a vehicle operable in one or more ground-operation modes and one or more flight-operation modes. The control system includes: one or more actuator housings; a plurality of actuator pistons coupled to the one or more actuator housings, each of the actuator pistons mechanically coupled to one another and a common output device; a plurality of primary stages coupled to the one or more actuator housings, each of the primary stages operatively coupled to move a respective actuator piston relative to at least one of the one or more actuator housings, and each of the primary stages functioning independent of any other primary stage when the control system is operating in a flight-operation mode; and an auxiliary stage operatively coupled to a first actuator piston of the plurality of actuator pistons to move the first actuator piston relative to at least one of the one or more actuator housings when the control system is operating in a ground-operation mode, with each of the plurality of primary stages being responsive to movement of the first actuator piston by the auxiliary stage.

In some examples, the one or more actuator housings are coupled to a structural component of the vehicle, and the common output device is coupled to a control surface of the vehicle.

In some examples, the one or more actuator housings include a first actuator housing defining an interior cavity containing a hydraulic fluid, and at least one of the plurality of actuator pistons resides in the interior cavity, such that movement of the at least one actuator piston includes translation through the interior cavity to displace at least a portion of the hydraulic fluid.

In some examples, the plurality of actuator pistons are directly connected to a common output shaft, such that movement of one actuator piston effects movement of the other actuator pistons.

In some examples, one or more of the primary stages and the auxiliary stage include hydraulic stages including a pressure source.

In some examples, a primary stage from among the one or more of the primary stages is coupled to a second actuator piston and includes a servo valve and a bypass valve, the bypass valve operatively coupled to regulate fluid communication between the servo valve and the second actuator piston. In some examples, the bypass valve includes: a frame; a spring-biased spool coupled to move relative to the frame, the spool defining an interior bore; a spring-biased plunger movable within the interior bore of the spool; and a displacement sensor responsive to movement of the plunger relative to the frame. In some examples, the bypass valve further includes a pilot valve operatively coupled to move the spring-biased spool relative to the frame in response to movement of the first actuator piston by the auxiliary stage. In some examples, the frame includes an interior bore receiving a portion of the pilot valve as the pilot valve moves the spring-biased spool, and pressurization of a portion of the interior bore inhibits operation of the pilot valve. In some examples, when the control system is operating in a ground-operation mode, the bypass valve is moved to a bypass position where the servo valve is isolated from a pressure source. In some examples, the control system further includes a spring biasing member operatively coupled to urge a portion the servo valve to a predetermined testing position when the servo valve is isolated from the pressure source, and movement of the first actuator piston by the auxiliary stage causes displacement of an internal portion of the servo valve. In some examples, the control system further includes a sensor responsive to displacement of the internal portion of the servo valve.

Another aspect provides a method of operating a redundant control system of a vehicle including one or more actuator housings and a plurality of actuator pistons coupled to the one or more actuator housings, each of the actuator pistons mechanically coupled to one another and a common output device. The method includes: in a flight-operation mode of the control system, driving a first actuator piston of the plurality of actuator pistons to move relative to at least one of the one or more actuator housings with a first primary stage of a plurality of primary stages, the first primary stage functioning independent of any other primary stage; and in a ground-operation mode of the control system, driving the first actuator piston to move relative to at least one of the one or more actuator housings with an auxiliary stage, driving a bypass valve and a servo valve of a second primary stage to move in response to driving the first actuator piston to move, and detecting movement of the bypass valve and the servo valve of the second primary stage.

In some examples, the method further includes, in the flight-operation mode, operating one or more other primary stages in a passive state.

In some examples, the first primary stage includes a bypass valve, and the method further includes, in the flight-operation mode, actuating the bypass valve of the first primary stage to an active state, and actuating the bypass valve of the second primary stage to a bypass state.

In some examples, the bypass valve includes a frame and a spring-biased spool coupled to move relative to the frame; and driving the bypass valve to move includes: routing fluid from the at least one housing to a pilot valve of the bypass valve as the first actuator piston moves relative to the at least one housing, the pilot valve operatively coupled to move the spring-biased spool relative to the frame in response by hydraulic fluid pressure. In some examples, detecting movement of the bypass valve includes detecting movement of a plunger coupled to the spool with a displacement sensor disposed in an interior bore of the frame.

In some examples, the servo valve includes a first stage and a second stage, and driving the servo valve to move includes: routing fluid from the at least one housing to the second stage of the servo valve, routing at least a portion of the fluid from the second stage of the servo valve to the first stage of the servo valve; and displacing a spring-biased spool of the second stage of the servo valve with hydraulic fluid pressure from the fluid. In some examples, detecting movement of the servo valve includes detecting movement of the spring-biased spool with a displacement sensor.

One or more embodiments of the present disclosure may provide a control system for a vehicle that is operable in a ground-operation mode to facilitate testing of a plurality of redundant hydraulic stages using a lesser number of auxiliary pressure sources. That is, the number of auxiliary pressure sources is less than the number of hydraulic stages. In some embodiments, the vehicle control system includes a single auxiliary pressure source that is operable to facilitate testing of multiple hydraulic stages. Reducing the number of auxiliary pressure sources improves the vehicle control system by decreasing both cost and weight.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is a diagram illustrating an exemplary dual tandem actuator.

FIG. 1B is a diagram illustrating an exemplary dual parallel actuator.

One or more elements of the drawings may be exaggerated to better show the features, process steps, and results. Like reference numbers and designations in the various drawings may indicate like elements.

DETAILED DESCRIPTION

Figure 2:
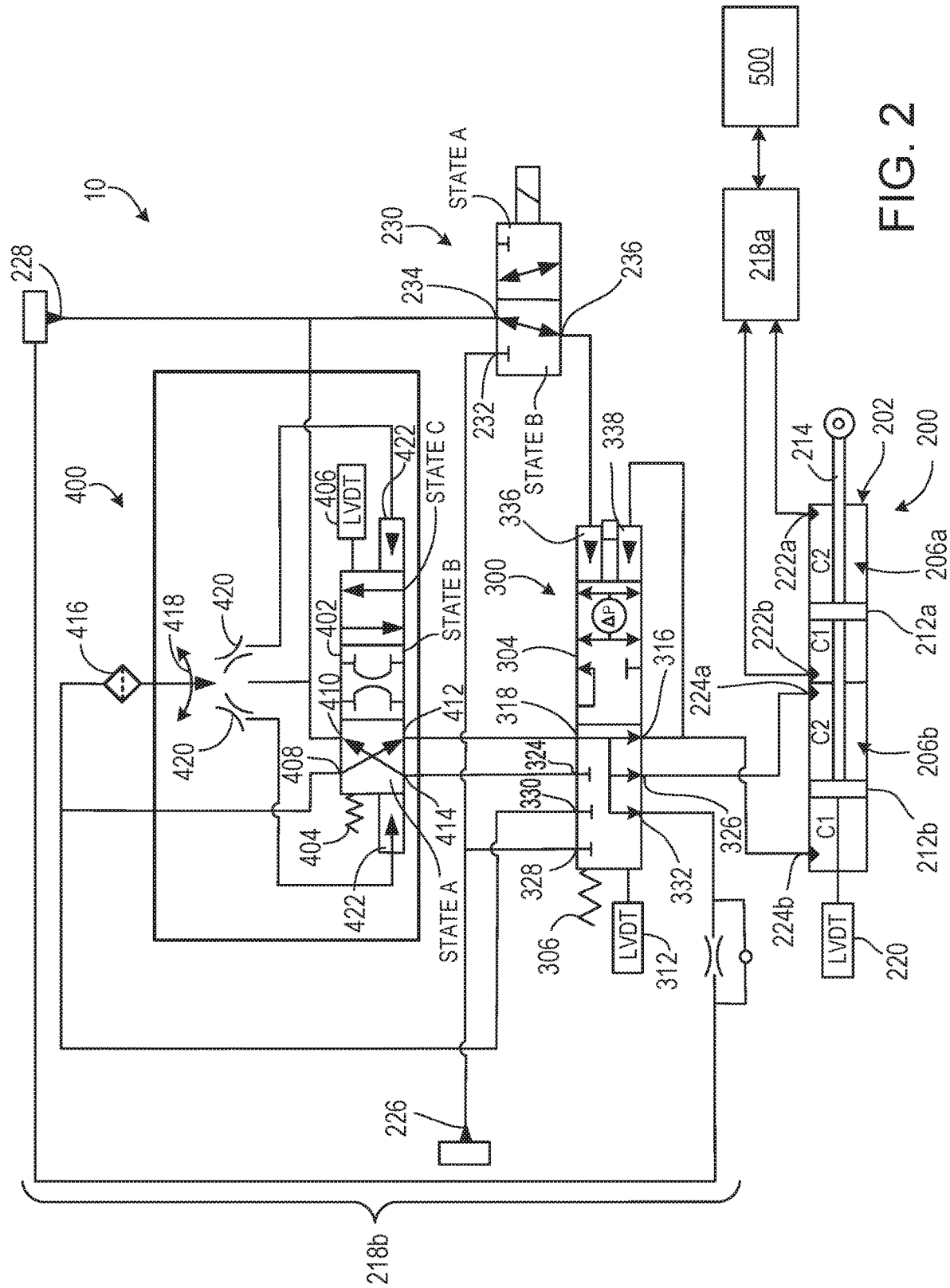
FIG. 2 is a plan view diagram illustrating an exemplary redundant vehicle control system.

FIG. 1A illustrates a first example hydraulic actuator 100 in accordance with one or more embodiments of the present disclosure. In some embodiments, the hydraulic actuator 100 can be incorporated in a vehicle control system (e.g., the vehicle control system 10 of FIG. 2). For example, the hydraulic actuator 100 may be incorporated in an aircraft flight control system, such as a fly-by-wire control system. In some embodiments, the vehicle control system is operable in one or more ground and flight operating modes, as described below.

As shown in FIG. 1A, the hydraulic actuator 100 includes an actuator housing 102 defining an interior cavity 104 separated into a first fluid chamber 106a and a second fluid chamber 106b by a dividing wall 108. In this example, the first and second chambers 106a,106b are arranged in an end-to-end configuration. The exterior of the housing 102 includes a coupling 110 for attaching the actuator 100 to a structural component of a vehicle (e.g., a portion of the vehicle's frame). The hydraulic actuator 100 further includes a first actuator piston 112a and a second actuator piston 112b residing in the respective first and second fluid chambers 106a,106b. The first and second actuator pistons 112a,112b are disposed on a common output shaft 114 extending through the interior cavity 104 of the actuator housing 102. A distal end of the output shaft 114 includes a coupling 116 for attaching the actuator 100 to a control surface of the vehicle.

The first and second actuator pistons 112a,112b are driven to move through the actuator housing 102 by respective first and second primary stages 118a,118b (shown schematically). The first and second primary stages 118a,118b are designed to provide fluid pressure on either side of the corresponding first and second actuator pistons 112a,112b to control movement of the pistons. Higher fluid pressure at one end of the chamber urges the piston towards the other end of the chamber. Movement of the first and second actuator pistons 112a,112b effects movement of the output shaft 114, and therefore movement of the vehicle control surface (not shown). Each of the first and second primary stages 118a,118b may include a hydraulic pressure system animated by a pressure source including one or more pumps. The first and second primary stages 118a,118b may be configured to function entirely independent of one another when the vehicle control system is operating in a flight-operation mode. The independently functioning stages provide a redundancy for the vehicle control system, such that failure of one stage does not render the control system inoperable. In some examples, one of the first and second primary stages 118a,118b is operated in a neutral bypass mode while the other primary stage is operated in an active mode during vehicle operations, such that only one of the primary stages is controlling the output shaft 114 at any given time.

FIG. 1B illustrates a second example hydraulic actuator 100' in accordance with one or more embodiments of the present disclosure. Similar to the example of FIG. 1A, the hydraulic actuator 100' may be incorporated in a redundant vehicle control system operable in one or more ground-operation modes and one or more flight-operation modes. In this example, the hydraulic actuator 100' includes an actuator housing 102' defining an interior cavity 104' separated into a first fluid chamber 106a' and a second fluid chamber 106b' by a dividing wall 108'. In this example, the first and second chambers 106a',106b' are arranged in a side-by-side configuration. The exterior of the housing 102' includes a coupling 110' for attaching the actuator 100' to a structural component of a vehicle. The hydraulic actuator 100' further includes a first actuator piston 112a' and a second actuator piston 112b' residing in the respective first and second fluid chambers 106a',106b'. In this example, the first actuator piston 112a' is coupled to a first output shaft 114a' and the second actuator piston 112b' is coupled to a second output shaft 114b'. The distal ends of the first and second output shafts 114a',114b' are linked by a coupling 116'. The coupling 116' is also designed for attaching the actuator 100' to a control surface of the vehicle. As in the example of FIG. 1A, the first and second actuator pistons 112a',112b' are driven to move through the actuator housing 102' by first and second primary stages 118a',118b', which may function independently when the vehicle control system is operating in a flight-operation mode.

FIG. 2 illustrates a redundant vehicle control system 10 in accordance with one or more embodiments of the present disclosure. The vehicle control system 10 is operable in one or more ground-operation modes and one or more flight-operation modes. In some examples, the vehicle control system 10 operates in a flight-operation mode when the vehicle is in an active state (e.g., powered on and in use). As noted above, a suitable vehicle control system may include two or more redundant primary stages functioning independent of one another during a flight-operation mode, with only one of the primary stages operating in an active state at any given time. In some examples, the vehicle control system 10 operates in a ground-operation mode when the vehicle is a dormant state (e.g., powered off and not in use). Note that the vehicle control system 10 is depicted in FIG. 2 in a ground-operation mode. A ground-operation mode may include a testing mode (e.g., a pre-flight test mode), where one or more components of the vehicle control system 10 are artificially stimulated and monitored to ensure proper functioning. In the example described below, the primary stages of the vehicle control system 10 are stimulated and monitored during the testing mode.

As shown in FIG. 2, the vehicle control system 10 includes an actuator 200 (similar to the example described above with reference to FIG. 1A) and an auxiliary stage 500. The actuator 200 includes first and second actuator pistons 212a, 212b driven through first and second fluid chambers 206a, 206b of an actuator housing 202 by a first primary stage 218a (shown schematically) and a second primary stage 218b (shown diagrammatically), respectively. The actuator 200 further includes a displacement sensor 220 (e.g., a linear variable differential transformer or "LVDT") for monitoring movement of the output shaft 214. Each of the first and second fluid chambers 206a, 206b includes a pair of fluid ports 222a, 222b and 224a, 224b at opposing ends of the respective chambers. As noted above, the first and second primary stages 218a, 218b are designed to provide fluid pressure on either side (i.e., the "C1" or "C2" side) of the corresponding actuator pistons 212a, 212b to control movement of the pistons, when the vehicle control system 10 is operating in a flight-operation mode. Higher fluid pressure at one end of the chamber urges the piston towards the opposite end. Thus, the primary stages are designed to move the pistons, and therefore the output shaft, towards one end of the chamber(s) by injecting hydraulic working fluid through the port located at the opposite end.

The second primary stage 218b includes a pressure source 226 and return reservoir 228. The pressure source 226 may include one or more suitable pressure regulating apparatuses (e.g. a pump) for controlling (e.g., increasing) the pressure of a working fluid (e.g., a hydraulic fluid). The return reservoir 228 may include one or more vessels for receiving working fluid passed through various components of the second primary stage 218b, containing the working fluid, and supplying the working fluid to the pressure source 226. The second primary stage 218b further includes a bypass valve 300 and a servo valve 400. When the vehicle control system 10 is in a flight-operation mode, the servo valve 400 receives pressurized working fluid from the pressure source 226 and conveys at least a portion of the pressurized fluid to the ports 224a, 224b of the actuator 200 for driving the actuator piston 212b. The bypass valve 300 is disposed between the servo valve 400 and the actuator 200, and regulates fluid communication between these and other components of the second primary stage 218b. For example, as described below, the bypass valve 300 may be movable between an active position and a bypass position to regulate fluid communication between various components of the second primary stage 218b.

A solenoid 230 is provided to control the bypass valve 300, as discussed below. In this example, the solenoid 230 includes a supply pressure port 232 leading to the pressure source 226, a return port 234 leading to the return reservoir 228, and a bypass control port 236 leading to the bypass valve 300. As shown schematically in FIG. 2, the solenoid 230 is operable in a first state (state A) and a second state (state B). In state A, the return port 234 is blocked and the supply pressure port 232 is in fluid communication with bypass control port 236, such that pressurized working fluid is routed to the bypass valve 300. In state B, the supply pressure port 232 is blocked and the return port 234 is in fluid communication with the bypass control port 236, such working fluid is routed from the bypass valve 300.

Figure 3A:
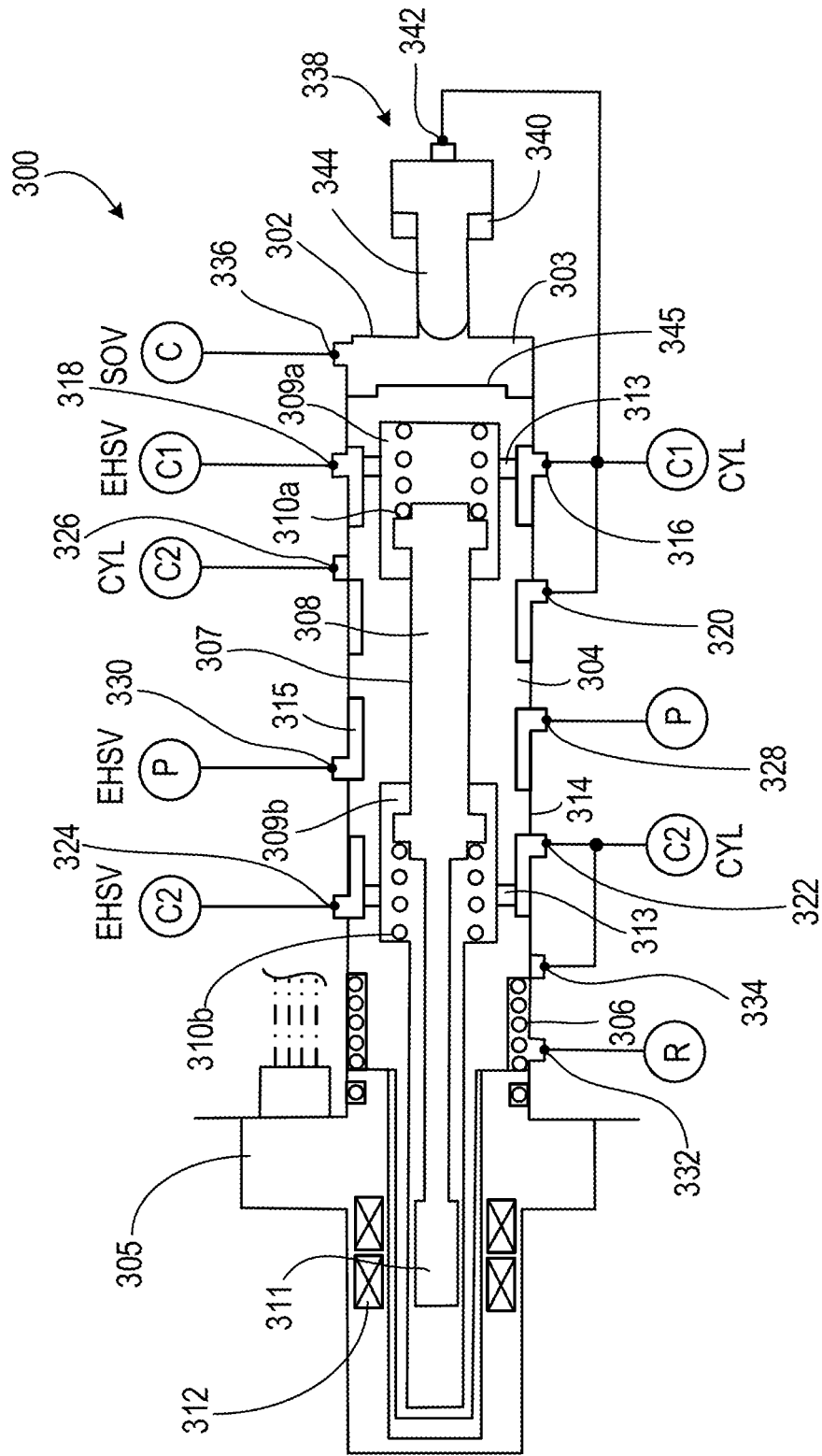
FIGS. 3A-3C are progressive diagrams illustrating an exemplary operation of a bypass valve of a redundant vehicle control system.
Figure 3B:
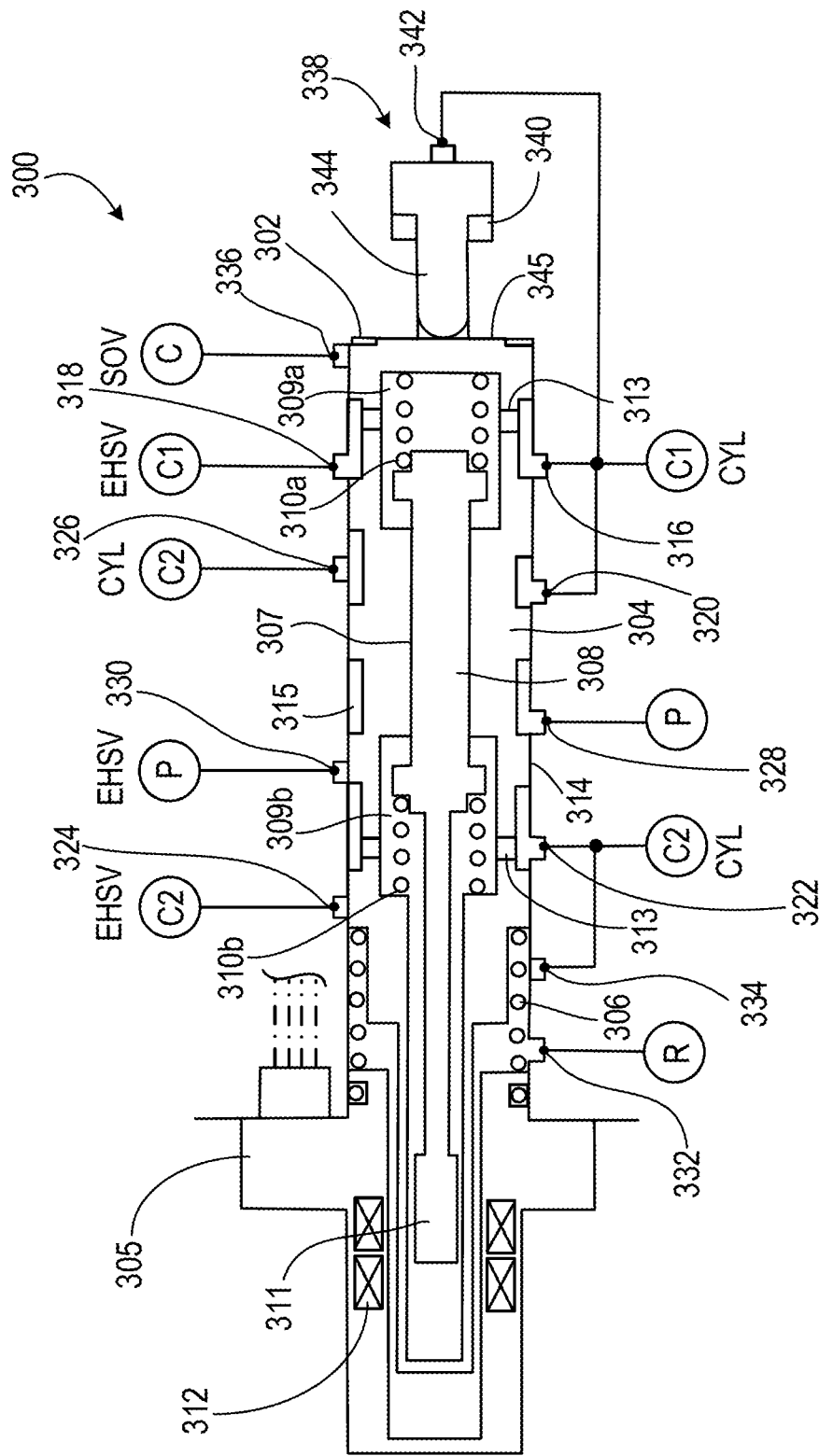
Figure 3C:
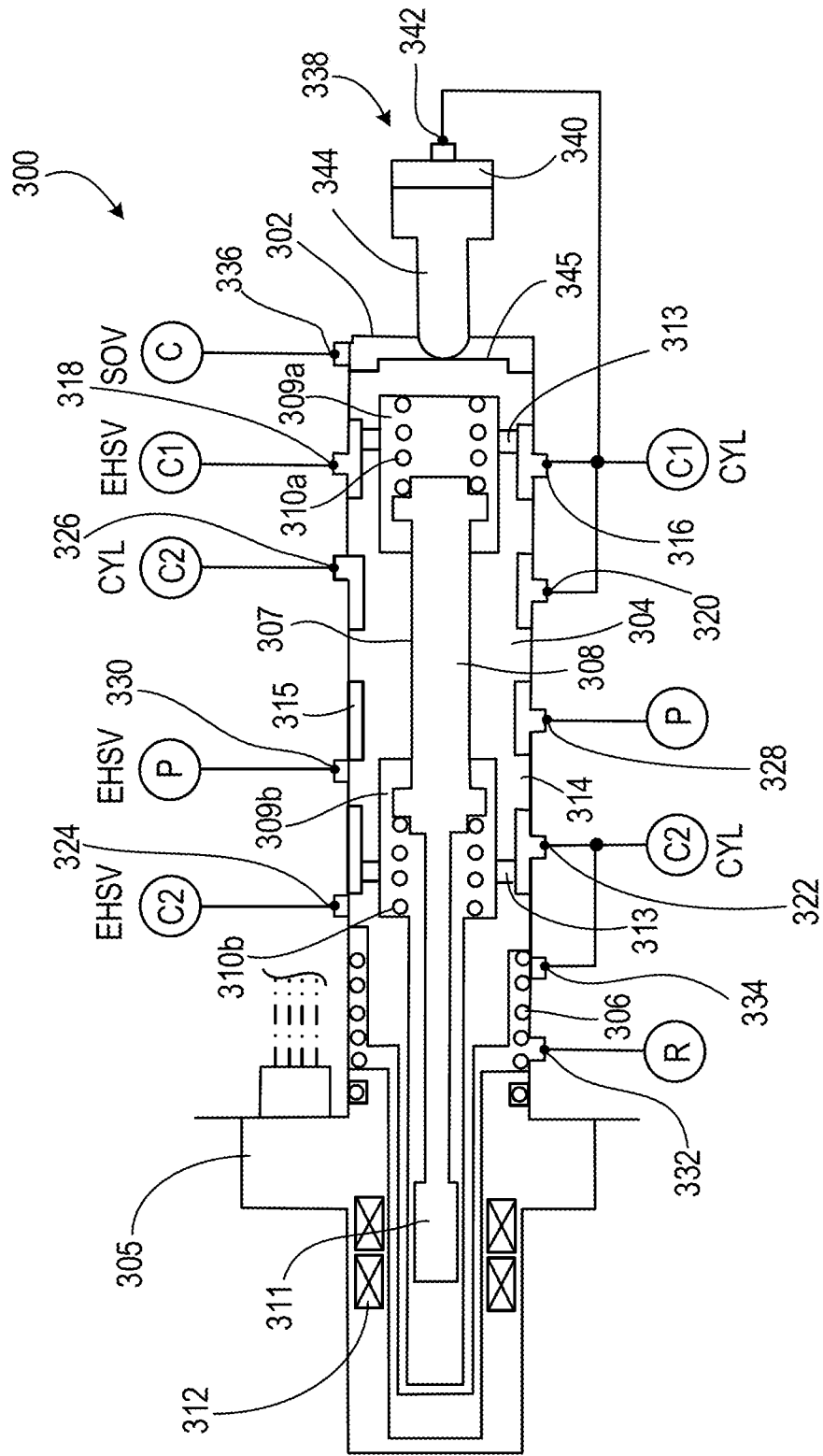

FIGS. 3A-3C illustrate a bypass valve 300 (e.g., the bypass valve incorporated in the vehicle control system 10) in accordance with one or more embodiments of the present disclosure. As shown, the bypass valve 300 includes a frame 302 defining a central bore 303 in which a spool 304 is disposed. The spool 304 is movable within the central bore 303 of the frame 302, and biased against a flange 305 of the frame 302 by a spring member 306. The spool 304 also defines a central bore 307 in which a plunger 308 is disposed. The plunger 308 is movable within the central bore 307. The central bore 307 of the spool 304 includes a first spring chamber 309a housing a first spring member 310a and a second spring chamber 309b housing a second spring member 310b. While each of the first and second spring chambers 309a,309b are fluidically isolated from one another, both of the first and second spring chambers 309a, 309b include fluid ports 313 open to the frame's central bore 303, which allows working fluid passing through certain ports of the frame 302 (discussed below) to independently pressurize the respective first and second spring chambers 309a,309b. The first and second spring members 310a,310b counter bias the plunger 308, such that the plunger 308 is suspended by equal spring force in the central bore 307 of the spool 304. Thus, the plunger 308 is moved through the spool's central bore 307 by the fluid pressure differential between the first and second spring chambers 309a,309b. The plunger 308 includes an armature 311 projecting outward into the central bore 303 of the frame 302. A displacement sensor 312 (e.g., an LVDT) disposed on the frame 302 is responsive to movement of the armature 311 through the frame 302. The displacement sensor 312 detects movement of both the plunger 308 and the spool 304, because the armature 311 is coupled to both of these components.

The outer surface of the spool 304 defines a plurality of alternating lands 314 and grooves 315. The lands 314 sealingly engage the inner surface of the frame's central bore 303, such that the grooves 315 are fluidically isolated from one another. The outer surface of the frame includes a plurality of ports 316-336 that receive and/or eject fluid to and/or from various other components of the primary stage (e.g., the second primary stage 218b of FIG. 2). Fluid flow through the bypass valve 300 is permitted when any two ports are aligned with the same groove 315 of the spool 304. Fluid flow through the bypass valve 300 is inhibited when one of the lands 314 blocks a port or when only one port is aligned with a groove 315.

In this example, the plurality of ports includes a primary C1 chamber port 316 and a corresponding C1 servo valve port 318. The primary C1 chamber port 316 leads to (or is otherwise in fluid communication with) the C1 side of an actuator fluid chamber (e.g., the fluid chamber 206b of FIG. 2); and the port 318 leads to the servo valve (e.g., the servo valve 400 of FIG. 2). The ports 316,318 are positionally aligned on the frame 302, such that, in this example, they are always associated with the same groove 315 in any position of the spool 304 (e.g., the spool positions shown in FIGS. 3A-3C). Notably, the fluid ports 313 of the first spring chamber 309a are also always aligned with the ports 316, 318, in this example—meaning that the first spring chamber 309a remains exposed to the C1 side of the actuator fluid chamber throughout operation of the bypass valve 300. The plurality of ports further includes an auxiliary C1 chamber port 320, which also leads to the C1 side of the actuator fluid chamber.

The plurality of ports still further includes a primary C2 chamber port 322 and a corresponding C2 servo valve port 324. The primary C2 chamber port 322 leads to the C2 side of the actuator fluid chamber; and the port 324 leads to the servo valve. The ports 322,324 are positionally close, but offset on the frame 302, such that they may be associated with the same groove 315 or land 314 (in some examples) in only certain positions of the spool 304 (e.g., the spool position shown in FIG. 3A). Notably, the fluid ports 313 of the second spring chamber 309a are also always aligned with the port 322, in this example—meaning that the second spring chamber 309b remains exposed to the C2 side of the actuator fluid chamber throughout operation of the bypass valve 300. The plurality of ports still further includes an auxiliary C2 chamber port 326, which also leads to the C2 side of the actuator fluid chamber. The ports 320,326 are positionally close, but offset on the frame 302, such that they may be associated with the same groove 315 or land 314 (in some examples) in only certain positions of the spool 304 (e.g., the spool positions shown in FIGS. 3B and 3C).

The plurality of ports still further includes a main supply pressure port 328 and a servo valve pressure port 330. The main supply pressure port 328 leads to the main pressure source of the primary stage (e.g., pressure source 226 of FIG. 2); and the servo valve pressure port 330 leads to the servo valve. The ports 328,330 are positionally close, but offset on the frame 302, such that they may be associated with the same groove 315 or land 314 (in some examples) in only certain positions of the spool 304 (e.g., the spool position shown in FIG. 3A). The plurality of ports still further includes a return reservoir port 332 and a C2 chamber return port 334, which also leads to the C2 side of the actuator fluid chamber. The return reservoir port 332 leads to a return reservoir of the primary stage (e.g., the return reservoir 228 of FIG. 2). The ports 332,334 are positionally close, but offset on the frame 302, such that they may be associated with the same groove 315 or land 314 (in some examples) in only certain positions of the spool 304 (e.g., the spool positions shown in FIGS. 3B and 3C). In this example, the ports 332,334 may be aligned with the spool groove 315 that contains the biasing spring member 306 biasing the spool 304 against the frame 302. The presence of the spring member 306 in the groove 315 creates a viscous drag force that causes significant pressure loss as fluid flows from the C2 chamber return port 334 to the return reservoir port 332. As discussed below, this pressure loss causes back pressure in the fluid lines that is used to animate other components of the primary stage. The plurality of ports still further includes a control solenoid port 336, which leads to a control solenoid valve of the primary stage (e.g., the control solenoid 230 of FIG. 2).

A pilot valve 338 is configured to effect movement of the spool 304 within the central bore 303 of the frame 302, when the vehicle control system is in a ground-operation mode. In this example, the pilot valve 338 includes a valve chamber 340, a valve inlet port 342 and a stem 344. The valve inlet port 342 leads to the C1 side of the actuator fluid chamber. Working fluid received from the actuator fluid chamber enters the valve chamber 340 and urges the stem 344 outward into the central bore 303 of the frame 302 and towards a surface 345 of the spool 304 (see FIG. 3C).

FIGS. 3A-3C illustrate the bypass valve 300 in three different operating positions (or "modes"). FIG. 3A illustrates the bypass valve 300 in an active position; FIG. 3B illustrates the bypass valve 300 in a first bypass position; and FIG. 3C illustrates the bypass valve 300 in a second bypass position. Referring first to FIG. 3A, when the bypass valve 300 is in the active position, pressurized working fluid is received through the control solenoid port 336, which urges the spool 304 downward against the spring member 306 (note that "downward" refers to the axial direction towards the displacement sensor 312, and "upward" refers to the axial direction towards the pilot valve 338). The hydraulic pressure force overcomes the spring force to drive the spool 304 downward through the frame's central bore 303. In this position, first, the primary C1 chamber port 316 and the corresponding C1 servo valve port 318 are aligned with a spool groove 315, which allows fluid flow through the bypass valve 300 between the C1 side of the actuator fluid chamber and the servo valve. Second, the primary C2 chamber port 322 and the corresponding C2 servo valve port 324 are also aligned with a spool groove 315, which allows fluid flow through the bypass valve 300 between the C2 side of the actuator fluid chamber and the servo valve. Third, the main supply pressure port 328 and the servo valve pressure port 330 are also aligned with a spool groove 315, which allows fluid flow through the bypass valve 300 between the main pressure source of the primary stage and the servo valve. As described in detail below, when the vehicle control system is in a flight-operation mode and the bypass valve 300 is in an active position, the servo valve receives pressurized working fluid from the main pressure source and distributes at least a portion of the fluid to one of the respective C1 and C2 sides of the actuator fluid chamber to control movement of the valve piston. In this example, all other ports of the frame 302 are blocked by one of the spool's lands 314 or are not aligned in a groove 315 with any other port.

Referring next to FIG. 3B, when the bypass valve 300 is in the bypass position, pressurized working fluid is removed from the frame's central bore 303 through control solenoid port 336. The lack of hydraulic pressure allows the spring member 306 to drive the spool back upward towards the top of the frame 302. In this position, first, the primary C1 chamber port 316 and the corresponding C1 servo valve port 318 remain aligned with a common spool groove 315 to permit fluid flow through the bypass valve 300 between the C1 side of the actuator fluid chamber and the servo valve. Second, the auxiliary C1 chamber port 320 and the auxiliary C2 chamber port 326 are also aligned with a spool groove 315, which allows fluid flow through the bypass valve 300 between the C1 and C2 sides of the actuator fluid chamber. Third, the return reservoir port 332 and the C2 chamber return port 334 are also aligned with a spool groove 315, which allows fluid flow through the bypass valve 300 between the C2 side of the actuator fluid chamber and the return reservoir of the primary stage. Thus, the C1 side of the actuator is in fluid communication with the C2 side of the actuator and the return reservoir of the primary stage. In this example, all other ports of the frame 302 are blocked by one of the spool's lands 314 or are not aligned in a groove 315 with any other port. Notably, in this position, the servo valve pressure port 330 is blocked by a land 314, meaning that the servo valve is isolated from the supply pressure source, and therefore cannot drive the valve piston, which places the primary stage in a "dormant" or "passive" state. As described in detail below, when the vehicle control system is in a flight-operation mode or a ground-operation mode and the bypass valve 300 is in a bypass position, fluid flow through the primary stage is dictated by movement of the actuator shaft by one or more of the other redundant primary stages of the system. In particular, when the actuator shaft is driven toward the C1 side of the actuator, fluid flows out of the actuator and into the bypass valve 300, where a first portion of the fluid is routed back to the C2 side of the actuator and a second portion of the fluid is routed to the return reservoir via the C2 chamber return port 334. Pressure loss accrued as fluid flows from the C2 chamber return port 334 to the return reservoir port 332 causes back pressure to build in the line leading to the C1 side of the actuator. The back pressure causes a third portion of the working fluid to flow to the servo valve via the C2 servo valve port and a fourth portion of the fluid to flow to the pilot valve 338.

As shown in FIG. 3C, pressurized fluid received at the inlet port 342 of the pilot valve 338 causes the valve stem 344 to bear against the surface 345 of the spool 304. The stem 344 presses the spool 304 downward against the spring member 306 to drive the spool 304 partially through the frame's central bore 303. Notably, the stroke of the pilot valve 338 is not long enough to place the bypass valve 300 back into an active position (see FIG. 3A). However, the spool displacement is sufficient to allow the displacement sensor 312 to perceive movement of the armature 311.

Referring back to FIG. 2, the servo valve 400 includes a first stage for receiving pressurized working fluid from the pressure source 226 and regulating the state of a second stage of the servo valve 400 using fluid pressure. The second stage is for routing working fluid from the pressure source 226 to and from the C1 or C2 side of the actuator fluid chamber 206b. The second stage of the servo valve 400 includes a frame (not shown) and a spool 402 movably supported within the frame. The spool 402 is biased against the frame by a spring member 404. A displacement sensor 406 (e.g., an LVDT sensor) is responsive to movement of the spool 402 within the frame. Similar to the bypass valve 300, the spool 402 includes a plurality of lands and grooves that facilitate the routing of fluid between various ports of the frame. In this example, the frame includes a pressure inlet port 408, a return port 410, a C1 chamber port 412, and a C2 chamber port 414. The pressure inlet port 408 leads to the servo valve pressure port 330 of the bypass valve 300. The return port 410 leads to the return reservoir 228. The C1 chamber port 412 leads to the C1 servo valve port 318 of the bypass valve 300. The C2 chamber port 414 leads to the C2 servo valve port 324 of the bypass valve 300. As illustrated schematically in FIG. 2, the spool 402 is movable within the frame between three different states—namely, states A, B and C. In state A, the C1 chamber port 412 is in fluid communication with the pressure inlet port 408, and the C2 chamber port 414 is in fluid communication with the return port 410. In state B, all of the ports are blocked by the lands of the spool 402 and/or misaligned within the grooves of the spool 402, such that there is no fluid communication between any of the ports. In state C, the C1 chamber port 412 is in fluid communication with the return port 410, and the C2 chamber port 414 is in fluid communication with the pressure inlet port 408.

When the bypass valve 300 is in the active position (see FIG. 3A), the second stage of the servo valve 400 routes fluid to and from the actuator fluid chamber 206b through the bypass valve 300. More specifically, when the servo valve 400 is in state A, working fluid is routed to the C1 side of the chamber 206b and routed from the C2 side of the chamber 206b; in state C, working fluid is routed to the C2 side of the chamber 206b and routed from the C1 side of the chamber 206b; and in state B, there is no fluid flow between the servo valve 400 and the chamber 206b. In some examples, the volume of fluid routed to and from the actuator fluid chamber 206b varies with the position of the spool 402 within the frame.

The first stage of the servo valve 400 includes a filter 416, a jet pipe 418, a pair of opposing jet receivers 420, and a pair of opposing jet receiver ports 422. As noted above, the first stage of the servo valve 400 is designed to receive pressurized working fluid from the pressure source 226 and regulate the state of a second stage of the servo valve 400 using fluid pressure. When the vehicle control system 10 is in a flight-operation mode and the bypass valve 300 is in an active position, working fluid from the pressure source 226 is received (via the bypass valve 300) at the filter 416 and subsequently routed to the jet receivers 420 and the jet receiver ports 422. The volume of fluid that passes the respective jet receivers is regulated by the position of the jet pipe 418. The jet pipe 418 is responsive to an electronic control signal (not shown). The volume of fluid routed to the respective jet receiver ports 422 dictates the position of the spool 402 within the frame—and therefor the state of the spool 402. When the bypass valve 300 is the bypass position (see FIGS. 3B and 3C), the servo valve 400 is isolated from the pressure source 226, and the biasing force of the spring member 404 urges the spool 402 to state A.

As previously discussed, the vehicle control system 10 is also operable in one or more ground-operation modes. In some examples, the vehicle control system 10 is operated in a ground-operation mode to test one or more components of the primary stages 218a,218b while the vehicle is dormant and not in use. In particular, the actuator 200, the bypass valve 300, and the servo valve 400 can be tested by animating the second primary stage 218b and detecting movement of the these components via their respective displacement sensors 220,312,406. In a ground-operation mode, the pressure source 226 may be rendered inoperable, because one or more pumps included therein are not powered by the vehicle. As such, the auxiliary stage 500 is used to animate both of the primary stages 218a,218b for testing while the vehicle's primary hydraulic sources are dormant. In some examples, the auxiliary stage 500 includes one or more pumps or other pressure boosting devices, and is operable to animate the components of the first primary stage 218a, such that the first actuator piston 212a is driven towards the C1 side of the first fluid chamber 206a. The first primary stage 218a may include one or more displacement sensors to monitor movement of various components as they hydraulically drive the first actuator piston 212a. Because the first and second actuator pistons 212a,212b are coupled to a common output shaft 214, movement of the first actuator piston 212a results in identical movement of the second actuator piston 212b through the second fluid chamber 206b. This movement of the second actuator piston 212b towards the C1 side of the second fluid chamber 206b causes fluid to flow out of the second fluid chamber 206b via fluid port 224b and into the bypass valve 300, which is in the bypass position.

As previously discussed in detail with reference to FIGS. 3B and 3C, when the bypass valve 300 is in the bypass position, a portion of the working fluid received from the C1 side of the second fluid chamber 206b causes the pilot valve 338 to move the spool 304 downward through the central bore of the frame 302. This displacement of the spool 304 is detected by the displacement sensor 312. As was also previously discussed, another portion of the working fluid received from the C1 side of the second fluid chamber 206b is routed to the servo valve 400 via the C1 servo valve port 318. The fluid is received at the C2 chamber port 412, with the spool 402 urged to the state A position by the spring member 404. Fluid received at the C2 chamber port is routed backwards through the supply pressure lines to the first stage of the servo valve 400. The fluid is fed through the filter 416 and routed by the jet receivers 420 to the jet receiver ports 422, which causes the spool 402 to move within the frame of the servo valve 400. The displacement sensor 406 detects this movement of the spool 402.

The use of terminology such as "upward" and "downward" throughout the specification and claims is for describing the relative positions of various components of the system and other elements described herein. Unless otherwise stated explicitly, the use of such terminology does not imply a particular position or orientation of the system or any component relative to the direction of the Earth gravitational force, or the Earth ground surface, or other particular position or orientation that the system or any components may be placed in during operation, manufacturing, and transportation.

A number of embodiments of the invention have been described. Nevertheless, it will be understood that various modifications may be made without departing from the spirit and scope of the inventions.

What is claimed is:

1. A redundant control system for a vehicle comprising:
   one or more actuator housings;
   a plurality of actuator pistons including first and second actuator pistons disposed within first and second fluid chambers of the one or more actuator housings, each of the plurality of actuator pistons mechanically coupled to one another and a common output device;
   a plurality of primary stages coupled to the one or more actuator housings, each of the primary stages operatively coupled to move a respective actuator piston of the plurality of actuator pistons relative to at least one of the one or more actuator housings,
   wherein at least one of the plurality of primary stages comprises a pressure source, a servo valve and a bypass valve, the bypass valve configured to regulate fluid communication between the pressure source, the servo valve, and the second fluid chamber, the bypass valve comprising:
      a frame comprising a bore;
      a spool residing within the bore of the frame, the spool configured to transition between an active state, where the servo valve is in fluid communication with the pressure source, and a bypass state, where the servo valve is isolated from the pressure source; and
      a pilot valve in fluid communication with the second fluid chamber of the one or more actuator housings, the pilot valve actuatable in response to movement of the first actuator piston when the bypass valve is in the bypass state, the pilot valve comprising a stem configured to project into the bore of the frame and bear against the spool when the pilot valve is actuated.

2. The control system of claim 1, wherein the one or more actuator housings are coupled to a structural component of the vehicle, and wherein the common output device is coupled to a control surface of the vehicle.

3. The control system of claim 1, wherein the one or more actuator housings comprise a first actuator housing defining the first fluid chamber, the first fluid chamber containing a hydraulic fluid, and wherein the first actuator piston is configured to translate through the first fluid chamber to displace at least a portion of the hydraulic fluid.

4. The control system of claim 1, wherein the plurality of actuator pistons are directly connected to a common output shaft, such that movement of one actuator piston effects movement of the other actuator pistons.

5. The control system of claim 1, further comprising an auxiliary stage operatively coupled to one of the plurality of primary stages.

6. The control system of claim 1, wherein the spool defines an interior spool bore containing a plunger movable within the interior spool bore.

7. The control system of claim 6, wherein the bypass valve further comprises a displacement sensor configured to detect movement of the plunger relative to the frame.

8. The control system of claim 7, wherein the bypass valve further comprises opposing first and second plunger springs configured to exert opposing spring forces against the plunger.

9. The control system of claim 8, wherein the first and second plunger springs reside within first and second spring chambers of the interior spool bore, and wherein the first and second spring chambers are fluidically isolated from one another.

10. The control system of claim 1, wherein pressurization of a portion of the bore of the frame inhibits actuation of the pilot valve.

11. The control system of claim 10, wherein the at least one of the plurality of primary stages further comprises a control valve configured to pressurize the portion of the bore of the frame.

12. The control system of claim 11, wherein the spool is configured to transition from the bypass state to the active state in response to pressurization of the portion of the bore of the frame by the control valve.

13. The control system of claim 12, wherein the bypass valve further comprises a bypass-valve spring configured to urge the spool to transition from the active state to the bypass state.

14. The control system of claim 1, further comprising a servo-valve spring operatively coupled to urge a portion of the servo valve to a predetermined testing position when the servo valve is isolated from the pressure source by the bypass valve.

15. The control system of claim 14, further comprising a sensor responsive to displacement of the portion of the servo valve.

16. A redundant control system for a vehicle comprising:
   first and second actuator pistons disposed within first and second fluid chambers, the first and second actuator pistons mechanically coupled to one another and a common output device;
   a first primary stage operatively coupled to an auxiliary stage and in fluid communication with the first fluid chamber; and
   a second primary stage comprising a pressure source, a servo valve and a bypass valve, the bypass valve configured to regulate fluid communication between the pressure source, the servo valve, and the second fluid chamber, the bypass valve comprising:
      a frame comprising a bore;
      a spool residing within the bore of the frame, the spool configured to transition between an active state, where the servo valve is in fluid communication with the pressure source, and a bypass state, where the servo valve is isolated from the pressure source; and a pilot valve in fluid communication with the second fluid chamber, the pilot valve actuatable in response to movement of the first actuator piston when the bypass valve is in the bypass state, the pilot valve comprising a stem configured to project into the bore of the frame and bear against the spool when the pilot valve is actuated.

17. The control system of claim 16, wherein the spool defines an interior spool bore containing a plunger movable within the interior spool bore, and wherein the bypass valve further comprises:
opposing first and second plunger springs configured to exert opposing spring forces against the plunger, wherein the first and second plunger springs reside within first and second spring chambers of the interior spool bore, and wherein the first and second spring chambers are fluidically isolated from one another; and
a displacement sensor configured to detect movement of the plunger relative to the frame.

18. The control system of claim 16, wherein the second primary stage further comprises a control valve configured to pressurize a portion of the bore of the frame, wherein pressurization of the portion of the bore of the frame by the control valve inhibits actuation of the pilot valve, and wherein the spool is configured to transition from the bypass state to the active state in response to pressurization of the portion of the bore of the frame.

19. The control system of claim 18, wherein bypass valve further comprises a bypass-valve spring configured to urge the spool to transition from the active state to the bypass state.

20. The control system of claim 16, further comprising: a servo-valve spring operatively coupled to urge a portion of the servo valve to a predetermined testing position when the servo valve, is isolated from the pressure source by the bypass valve; and a sensor responsive to displacement of the portion of the servo valve.

* * * * *

UNITED STATES PATENT AND TRADEMARK OFFICE
CERTIFICATE OF CORRECTION

Page 1 of 1

PATENT NO. : 10,969,035 B2
APPLICATION NO. : 15/059494
DATED : April 6, 2021
INVENTOR(S) : Mark Williams et al.

It is certified that error appears in the above-identified patent and that said Letters Patent is hereby corrected as shown below:

In the Claims

In Column 14, Line 16, Claim 20, please delete "valve," and insert -- valve --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*